United States Patent [19]
Wallner et al.

[11] Patent Number: 5,704,634
[45] Date of Patent: Jan. 6, 1998

[54] SIDE IMPACT AIR BAG MODULE

[75] Inventors: John P. Wallner, Rochester; Michael P. Pionk, Marysville, both of Mich.

[73] Assignee: TRW Vehicle Safety Systems Inc., Lyndhurst, Ohio

[21] Appl. No.: 601,721

[22] Filed: Feb. 15, 1996

[51] Int. Cl.[6] ............................................. B60R 21/26
[52] U.S. Cl. ........................... 280/728.2; 280/730.2; 280/740
[58] Field of Search ..................... 280/728.2, 740, 280/742, 736, 737, 741, 730.2, 730.1, 732, 728.1

[56] References Cited

U.S. PATENT DOCUMENTS

| | | | |
|---|---|---|---|
| 3,527,472 | 9/1970 | Chute et al. | 280/740 |
| 3,567,245 | 3/1971 | Ekstrom | 280/737 |
| 4,153,273 | 5/1979 | Risko | 280/740 |
| 4,981,534 | 1/1991 | Scheffee | 280/741 |
| 5,131,680 | 7/1992 | Coultas et al. | 280/737 |
| 5,195,777 | 3/1993 | Cuevas | 280/742 |
| 5,308,108 | 5/1994 | Rion | 280/728.2 |
| 5,348,342 | 9/1994 | Haland et al. | 280/730.2 |
| 5,458,362 | 10/1995 | Buchanan et al. | 280/728.2 |
| 5,484,163 | 1/1996 | Jenkins | 280/728.2 |
| 5,611,563 | 3/1997 | Olson et al. | 280/728.2 |

*Primary Examiner*—Peter C. English
*Attorney, Agent, or Firm*—Tarolli, Sundheim, Covel, Tummino & Szabo

[57] ABSTRACT

An air bag module (10) includes an air bag (30), an inflator (40), and a diffuser (100) that receives the inflator (40). The diffuser (100) has a central wall portion (102) which is spaced radially outward from the inflator (40) to define a diffuser chamber (128). A first end portion (110) of the diffuser (100) extends radially inward from the central wall portion (102) and blocks axial movement of the inflator (40) in a first axial direction (138). A second end portion (120) of the diffuser (100) has a curl portion (140) extending radially inward from the central wall portion (102) of the diffuser. The curl portion (140) blocks radial movement of the second end portion (80) of the inflator (40) and blocks axial movement of the inflator in a second axial direction (158) opposite to the first axial direction (138). The module (10) includes a plurality of bolts (130) for supporting the module on a portion of a vehicle such as a vehicle seat (14).

15 Claims, 2 Drawing Sheets

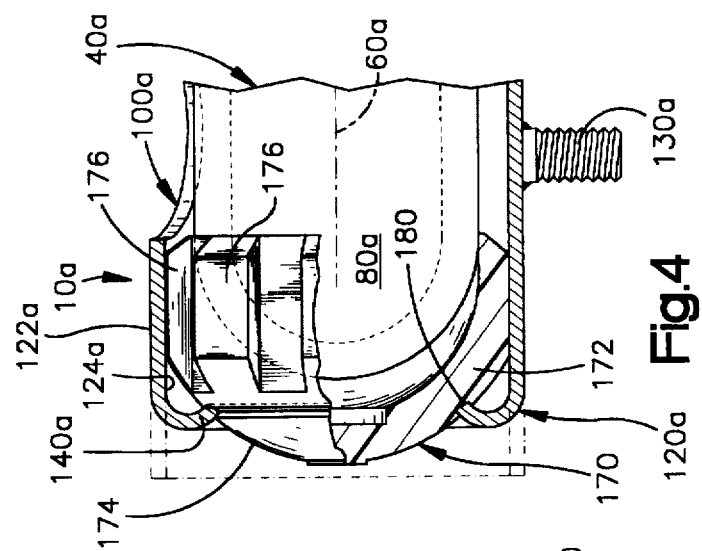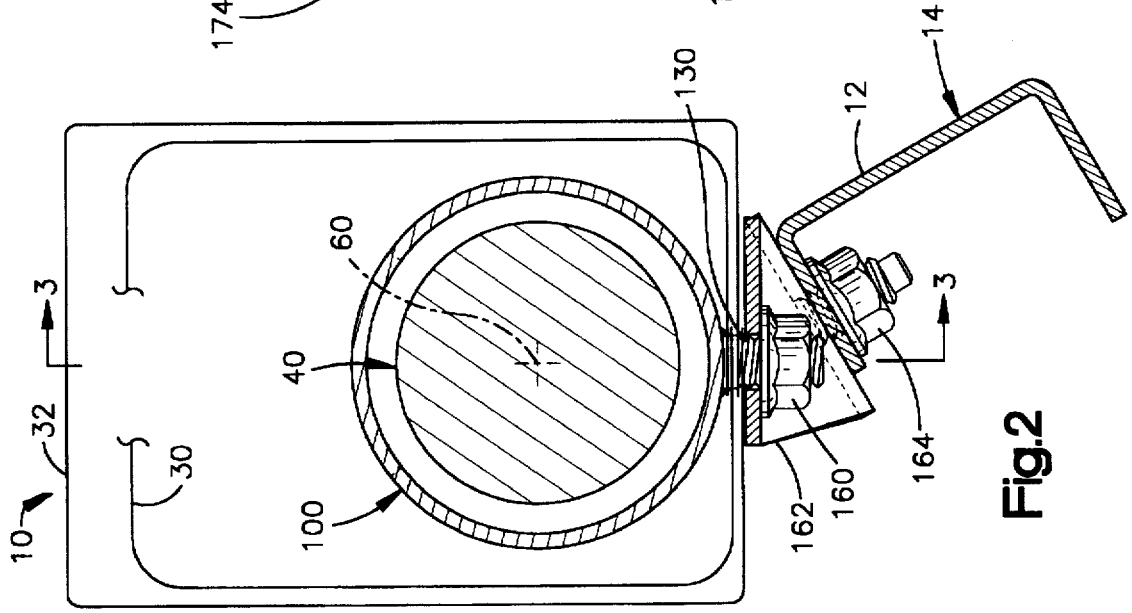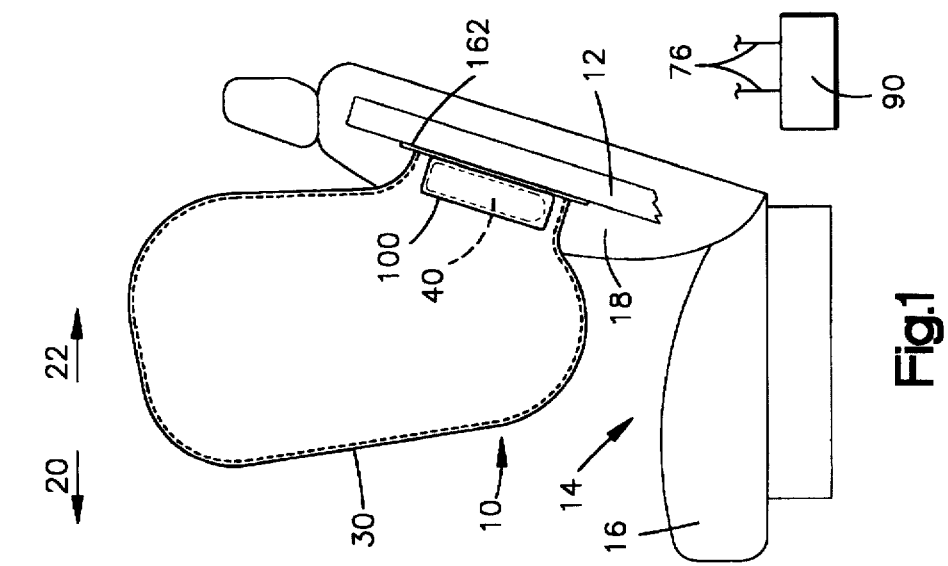

5,704,634

1

SIDE IMPACT AIR BAG MODULE

BACKGROUND OF THE INVENTION

1. Technical Field

The present invention relates to a vehicle safety apparatus and particularly relates to an air bag module including an inflatable vehicle occupant protection device, such as an air bag, for helping to protect a vehicle occupant in the event of a side impact to the vehicle.

2. Description of the Prior Art

It is known to inflate an air bag to help protect a vehicle occupant in the event of a side impact to a vehicle of a magnitude above a predetermined threshold. The air bag is stored in a deflated condition, together with an inflator, in a vehicle seat, for example. In the event of a side impact to the vehicle of a magnitude above the predetermined threshold, the inflator is actuated, and the air bag is inflated into a position between the vehicle occupant in the vehicle seat and the adjacent side structure of the vehicle such as a door or window of the vehicle or a body panel of the vehicle. The air bag helps protect the vehicle occupant from forcefully being struck by parts of the side structure of the vehicle. The air bag can also help protect the vehicle occupant from objects which might intrude into the vehicle, such as a pole or a tree, during the side impact.

SUMMARY OF THE INVENTION

The present invention is a vehicle safety apparatus for helping to protect an occupant of a vehicle in the event of an impact to the vehicle. The apparatus comprises an inflatable occupant protection device which has a deflated condition and which is inflatable into a position adjacent to the vehicle occupant for helping to protect the vehicle occupant. The apparatus also includes an inflator which is actuatable to provide inflation fluid for inflating the inflatable device. The inflator has an axis, a first end portion, a second end portion, and a central portion between the first and second end portions. The apparatus further includes a diffuser receiving the inflator. The diffuser has a central wall portion and first and second opposite end portions. The apparatus includes means for supporting the diffuser and the inflator on the vehicle. The central wall portion of the diffuser is spaced radially outward from the central portion of the inflator to define a diffuser chamber between the central wall portion of the diffuser and the central portion of the inflator. The first end portion of the diffuser extends radially inward from the central wall portion of the diffuser and blocks axial movement of the inflator in a first axial direction. The second end portion of the diffuser has a curl portion extending radially inward from the central wall portion of the diffuser in a direction toward the axis and toward the first end portion of the diffuser. The curl portion of the diffuser blocks radial movement of the second end portion of the inflator and blocks axial movement of the inflator in a second axial direction opposite to the first axial direction.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic side elevational view of a vehicle seat and an air bag module constructed in accordance with the present invention, showing the air bag in an inflated condition;

2

Figure 3:
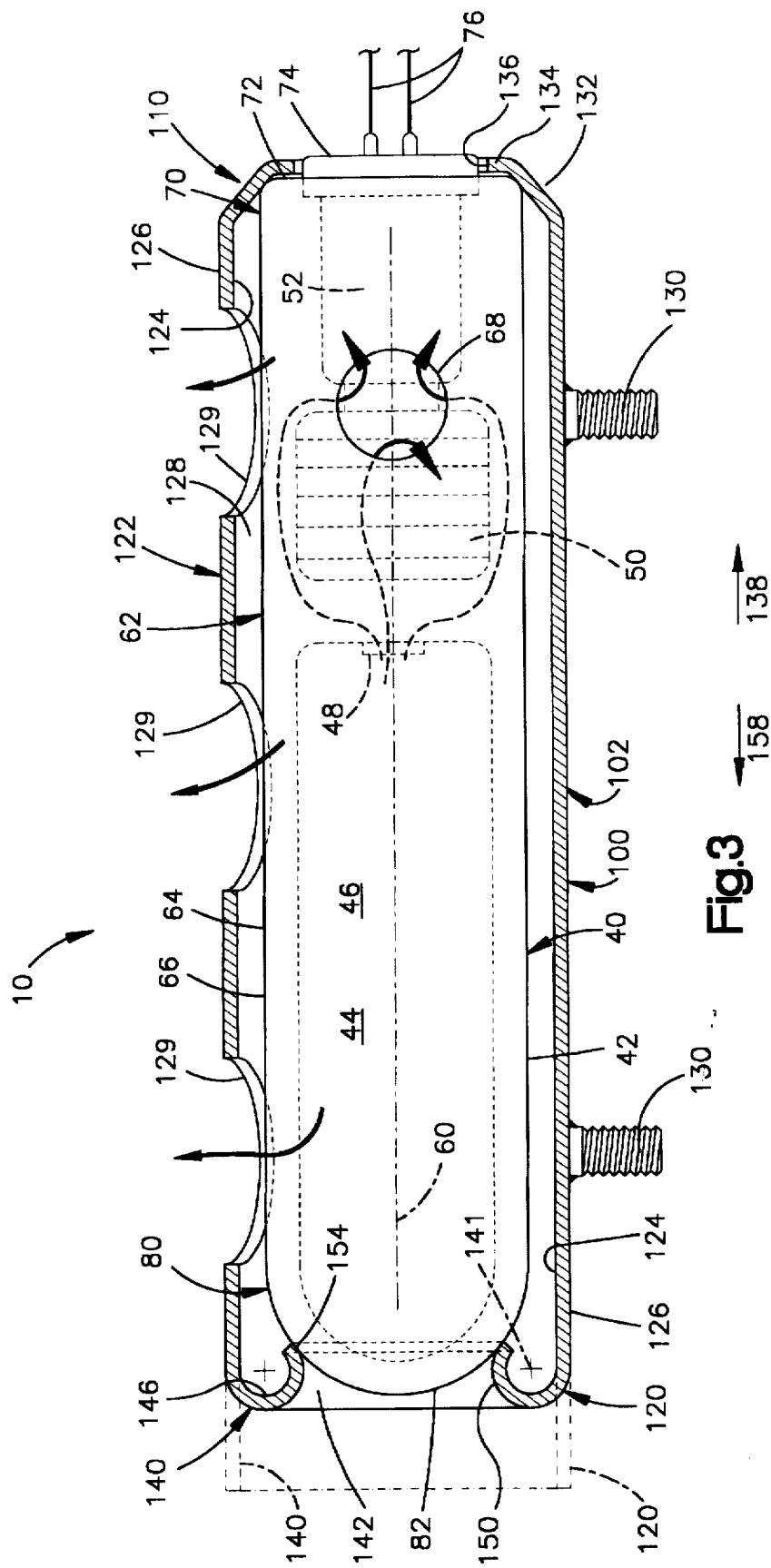

FIG. 2 is a schematic view, partially in section, of portion of the air bag module of FIG. 1;

FIG. 3 is a sectional view of an inflator and a diffuser which form a part of the air bag module of FIG. 1, taken generally along line 3—3 of FIG. 2; and FIG. 4 is a partial sectional view of a portion of an air bag module which is constructed in accordance with a second embodiment of the present invention.

DESCRIPTION OF PREFERRED EMBODIMENTS

The present invention relates to a vehicle safety apparatus, and particularly relates to an air bag module including an inflatable vehicle occupant protection device, such as an air bag, for helping to protect a vehicle occupant in the event of a side impact to the vehicle of a magnitude sufficient to require inflation of the inflatable device. The present invention is applicable to various vehicle safety apparatus constructions. As representative of the present invention, FIGS. 1–3 illustrate a vehicle safety apparatus or air bag module 10.

The air bag module 10 (FIG. 1) is connected with a seat frame member 12 of a seat 14 for an occupant of a vehicle. The seat 14 includes a seat bottom cushion 16 and a seatback 18 connected with the seat bottom cushion. A forward direction in the vehicle is indicated by the arrow 20 (FIG. 1) and a rearward direction in the vehicle is indicated by the arrow 22.

The air bag module 10 includes an inflatable device, illustrated schematically at 30, which is commonly known as an air bag. The air bag 30 is preferably made from a fabric material such as woven nylon. The air bag 30 can alternatively be made from a non-woven material, such as plastic film. The air bag module 10 also includes a cover indicated schematically at 32 (FIG. 2) which encloses the folded air bag 30. The cover 32 is opened by the inflating air bag 30 to enable deployment of the air bag into a position to help protect an occupant of the vehicle seat. The air bag module 10, including the cover 32, is located within the vehicle seatback 18 underneath the fabric material or leather covering of the seat.

The air bag module 10 also includes an inflator 40. The inflator 40 is illustrated as an "augment" type inflator which includes both inflation fluid stored in a container and an ignitable material for heating and thereby increasing the pressure of the inflation fluid. The module 10 alternatively could include an inflator which contains only a stored quantity of pressurized inflation fluid, or a pyrotechnic inflator which uses the combustion of gas-generating material to generate inflation fluid in the form of gas to inflate the air bag 30.

As illustrated schematically in FIG. 3, the inflator 40 includes a container 42 which defines an inflation fluid chamber 44. The inflation fluid chamber 44 contains a stored quantity of pressurized inflation fluid 46. At one end of the inflation fluid chamber 44 is a rupturable portion of the container or a rupturable member such as a burst disk 48. An ignitable material 50 is disposed within the container 42 at a location adjacent to the inflation fluid chamber 44 for, when ignited, heating inflation fluid 46 flowing from the inflation fluid chamber. An electrically actuatable igniter 52, for igniting the ignitable material 50 and for opening the inflation fluid chamber 44, is disposed adjacent to the ignitable material. A pair of lead wires 76 extend from a cylindrical end portion 74 of the igniter 52.

The inflator 40 has a generally cylindrical configuration centered on a longitudinal axis 60. A central portion 62 of the inflator 40 includes a cylindrical side wall 64 of the inflator. The side wall 64 has a cylindrical outer side surface 66. The central portion 62 of the inflator 40 also includes a plurality of fluid outlets 68 which are spaced apart 180° around the circumference of the inflator.

A first end portion 70 of the inflator 40 has a flat, radially extending end surface 72. The end portion 74 of the igniter 52 projects from the end surface 72 of the inflator 40. A second end portion 80 of the inflator 40 has a domed configuration including a convex outer surface 82. The convex outer surface 82 of the second end portion 80 of the inflator 40 merges with the cylindrical outer surface 66 of the central portion 62 of the inflator. The second end portion 80 of the inflator 40 includes one axial end portion (to the left as viewed in FIG. 3) of the inflation fluid chamber 44.

The vehicle in which the air bag module 10 is mounted includes known means indicated schematically at 90 (FIG. 1) for sensing a side impact to the vehicle and for actuating the inflator 40 in response to the sensing of a side impact. The means 90 may include a side impact sensor and vehicle circuitry for electrically actuating the inflator 40 in response to sensing a side impact to the vehicle above a predetermined threshold. The means 90 is electrically connected with the igniter 52 of the inflator 40, via the lead wires 76, for providing an actuation signal to the inflator.

The air bag module 10 also includes a diffuser 100 (FIGS. 2 and 3). The diffuser 100 is made from a single piece of metal and has an elongate, generally cylindrical configuration. The diffuser 100 includes a central portion 102, a first end portion 110, and a second end portion 120.

A cylindrical side wall 122 of the diffuser 100 extends for the length of the central portion 102 of the diffuser. The side wall 122 is centered on the axis 60 and has opposite inner and outer side surfaces 124 and 126. The central portion 102 of the diffuser 100, including the side wall 122, is spaced radially outward from the cylindrical outer surface 66 of the inflator 40.

An annular, axially extending, diffuser chamber 128 is defined between the side wall 122 of the diffuser 100 and the cylindrical outer surface 66 of the inflator 40. A series of circular fluid outlet openings 129 are formed in the side wall 122 of the diffuser 100 and communicate between the diffuser chamber 128 and the exterior of the diffuser. As illustrated, the openings 129 are aligned in a row centered on a line which extends parallel to the longitudinal axis 60. A pair of mounting bolts 130 extend radially outward from the side wall 122 of the diffuser 100, opposite the fluid outlet openings 129.

The first end portion 110 of the diffuser 100 is disposed at and supports the first end portion 70 of the inflator 40. The first end portion 110 of the diffuser 100 includes a frustoconical wall portion 132 which extends axially away from and radially inward from the cylindrical side wall 122 of the diffuser. The frustoconical wall portion 132 engages and supports the first end portion 70 of the inflator 40.

The first end portion 110 of the diffuser 100 also includes a flat, annular wall portion 134 which extends radially inward from the frustoconical wall portion 132. The wall portion 134 overlies the radially extending outer end surface 72 of the inflator 40. The wall portion 134 has a circular opening 136 which receives the cylindrical outer end portion 74 of the igniter 52. The opening 136 is preferably larger in diameter than the outer end portion 74 of the igniter 52. Alternatively, the opening 136 may engage and support the outer end portion 74 of the igniter 52.

The first end portion 70 of the inflator is thus supported on the first end portion 110 of the diffuser 100. By engaging the first end portion 70 of the inflator 40, the first end portion 110 of the diffuser 100 blocks radial movement of the first end portion of the inflator relative to the diffuser. The first end portion 110 of the diffuser 100 also blocks axial movement of the inflator 40, relative to the diffuser, in a first axial direction as indicated by the arrow 138, that is to the right as viewed in FIG. 3. The first end portion 110 of the diffuser 100 closes and seals the diffuser chamber 128 at one end, that is, to the right as viewed in FIG. 3.

A second end portion 120 of the diffuser 100 is disposed at and supports the second end portion 80 of the inflator 40. The second end portion 120 of the diffuser 100 comprises a curled wall portion or curl portion 140 of the diffuser. The second end portion 120 is formed as an extension of the cylindrical wall portion 122 of the diffuser 100. The second end portion 120 of the diffuser has a cylindrical configuration as shown in phantom in FIG. 3 prior to assembly of the air bag module 10. The second end portion 120 of the diffuser 100 is movable from the cylindrical condition shown in phantom in FIG. 3 to the curled condition shown in solid lines in FIG. 3 during assembly of the air bag module 10.

The curl portion 140 has an arcuate cross-sectional configuration centered on a circular bending axis 141, as seen in FIG. 3. The curl portion 140 of the diffuser 100 extends radially inward from the cylindrical side wall 122 at a plurality of locations which are disposed in a circular array which is centered on the axis 60. In the preferred embodiment, the curl portion 140 of the diffuser 100 extends radially inward from the cylindrical side wall 122, in a uniform manner, for 360° around the axis 60. The curl portion 140 defines a circular opening 142 which receives the second end portion 80 of the inflator 40. An inner side surface 146 of the curl portion 140 extends as a continuation of the inner side surface 124 of the cylindrical side wall 122 of the diffuser 100.

An outer side surface 150 of the curl portion 140 extends as a continuation of the outer side surface 126 of the cylindrical side wall 122 of the diffuser 100. The outer side surface 150 of the curl portion 140 engages the convex outer surface 82 of the domed second end portion 80 of the inflator 40. This engagement occurs along a circular area or line of engagement 154 extending around and centered on the axis 60, in a uniform manner for 360° around the axis. That is, the curl portion 140 of the diffuser 100 engages and supports the inflator 40 at a plurality or series of locations which are disposed in a circular array extending around the axis 60.

The second end portion 120 of the diffuser 100 closes and seals the diffuser chamber 128 at one end, that is, to the left as viewed in FIG. 3. The second end portion 120 of the diffuser 100 blocks axial movement of the inflator 40, relative to the diffuser, in a second axial direction as indicated by the arrow 158, that is, to the left as viewed in FIG. 3. The second end portion 120 of the diffuser 100 also blocks radial movement of the second end portion 80 of the inflator 40, relative to the diffuser.

The inflator 40 is inserted into the diffuser 100 when the diffuser has a completely cylindrical configuration, that is, when the end portions 110 and 120 of the diffuser are not yet bent radially inward from the cylindrical side wall 122. The first end portion 110 of the diffuser 100 is then deformed inward into engagement with the first end portion 70 of the inflator 40. The second end portion 120 of the diffuser 100 is then curled into engagement with the second end portion 80 of the inflator 40. The inflator 40 is clamped in the diffuser 100 with an axially directed force in the range of from about 80 pounds to about 300 pounds. The inflator 40 engages, or is connected with, the diffuser 100 only at the end portions 110 and 120 of the diffuser; there is no other connection or engagement between the inflator and the diffuser.

The assembly of the inflator 40 and the diffuser 100 is then inserted into the air bag 30 and the cover 32. The mounting bolts 130 extend through fastener openings in the air bag 30 and the cover 32. The lead wires 76 extend out of the air bag 30 through another opening (not shown) in the air bag.

A pair of nuts 160 secure a mounting bracket 162 on the mounting bolts 130. The mounting bracket 162 is then secured by fasteners 164 to the seat frame member 12 in the seatback 18. The module 10 is preferably mounted on the seatback 18 so that when the seatback is reclined at an angle of 25° from the vertical and the inflator 40 is actuated, the air bag 30 deploys in a generally forward and upward direction as illustrated in FIG. 1.

In the event of a side impact to the vehicle of a magnitude for which inflation of the air bag 30 is desired to help protect the vehicle occupant, the igniter 52 is actuated. The ignitable material 50 ignites and the burst disk 48 ruptures. The inflation fluid 46 flows out of the container 42, past the ignitable material 50. As the inflation fluid 46 flows past the ignitable material 50, the inflation fluid is heated and its pressure increases. The inflation fluid 46 flows out of the inflator 40, through the fluid outlets 68 in the inflator, and into the diffuser chamber 128. The inflation fluid 46 flows out of the diffuser chamber 128, through the openings 129 in the diffuser 100, and into the air bag 30. The rapidly flowing inflation fluid causes the air bag 30 to cut through the portions of the seatback 18 which overlie the module 10, such as foam cushion material and/or fabric material or leather covering of the seat. The air bag 30 inflates from a folded, stored condition to an inflated condition as illustrated in FIG. 1.

FIG. 4 illustrates a portion of an air bag module 10a which is constructed in accordance with a second embodiment of the present invention. Parts of the air bag module 10a which are the same as or similar to corresponding parts of the module 10 are given the same reference numeral with the suffix "a" added for clarity.

The air bag module 10a includes an inflator 40a which is the same as the inflator 40 (FIGS. 1–3). The module 10a includes a diffuser 100a which is generally similar to the diffuser 100 (FIGS. 1–3). In the diffuser 100a, however, the curl portion 140a does not engage the domed second end portion 80a of the inflator 40a. Instead, a cushion 170 is disposed between the curl portion 140a of the diffuser 100a and the second end portion 80a of the inflator 40a. The cushion 170 is made from a compressible material such as rubber or plastic and includes a generally hemispherical main body portion 172. The main body portion 172 of the cushion 170 is closely fitted around the domed end portion 80a of the inflator 40a. The main body portion 172 of the cushion 170 has a generally hemispherical outer side surface 174.

A plurality of ribs 176 project radially outward from the outer side surface 174 of the main body portion 172 of the cushion 170. The ribs 176 engage the inner side surface 124a of the cylindrical side wall 122a of the diffuser 100a. The engagement of the ribs 176 with the diffuser 100a maintains the second end portion 80a of the inflator 40a at a position centered on the axis 60a.

The curl portion 140a of the diffuser 100a engages the outer side surface 174 of the main body portion 172 of the cushion 170. An annular edge 180 of the curl portion 140a extends into the material of the main body portion 172 of the cushion 170 and clamps the cushion against the second end portion 80a of the inflator 40a. The cushion 170 blocks metal to metal contact between the second end portion 120a of the diffuser 100a and the second end portion 80a of the inflator 40a.

From the above description of the invention, those skilled in the art will perceive improvements, changes and modifications in the invention. For example, the second end portion of the diffuser need not have the curled configuration shown in FIGS. 1–4, but instead may have a different configuration, such as one similar to the configuration of the first end portion 110 of the diffuser. Thus, the second end portion of the diffuser may comprise one or more wall portions which extend radially inward, and perhaps axially in a direction away from the first end portion of the diffuser, but not axially in a direction toward the first end portion of the diffuser. Also, the first end portion of the diffuser could have a curled configuration similar to the configuration of the second end portion 120 of the diffuser 100. In either case, the inflator would still be clamped axially, between the diffuser end portions, with a force of from about 80 pounds to about 300 pounds. Further, a member such as the cushion 170 could be provided between the first end portion of the inflator and the first end portion of the diffuser, particularly if the first end portion of the inflator has a domed or non-flat configuration. Such improvements, changes and modifications within the skill of the art are intended to be covered by the appended claims.

Having described the invention, we claim:

1. A vehicle safety apparatus for helping to protect an occupant of a vehicle in the event of an impact to the vehicle, said apparatus comprising:

an inflatable occupant protection device having a deflated condition and being inflatable into a position adjacent to the vehicle occupant for helping to protect the vehicle occupant;

an inflator which is actuatable to provide inflation fluid for inflating said inflatable device, said inflator having a longitudinal axis, a first end portion, a second end portion, and a central portion between said first and second end portions;

said central portion of said inflator including a cylindrical side wall of said inflator, said first end portion of said inflator including a first end surface extending transverse to said cylindrical side wall, said second end portion of said inflator including a second end surface extending transverse to said cylindrical side wall;

a diffuser receiving said inflator, said diffuser having a central wall portion and first and second opposite end portions;

means for supporting said diffuser and said inflator on the vehicle;

said central wall portion of said diffuser being spaced radially outward from said central portion of said inflator to define a diffuser chamber between said central wall portion of said diffuser and said central portion of said inflator;

said first end portion of said diffuser extending radially inward from said central wall portion of said diffuser and engaging said transversely extending first end surface of said inflator and blocking axial movement of said inflator in a first axial direction; and said second end portion of said diffuser having a curl portion extending radially inward from said central wall portion of said diffuser in a direction toward said longitudinal axis, said curl portion of said diffuser engaging said transversely extending second end surface of said inflator and blocking radial movement of said second end portion of said inflator and blocking axial movement of said inflator in a second axial direction opposite to said first axial direction.

2. An apparatus as set forth in claim 1 wherein said inflator comprises a container having an inflation fluid chamber in which inflation fluid is stored under pressure, an ignitable material for, when ignited, heating said inflation fluid, and ignition means for igniting said ignitable material and for opening said container, said inflator including at least one fluid outlet for directing heated inflation fluid from said inflator into said diffuser chamber.

3. A vehicle safety apparatus for helping to protect an occupant of a vehicle seat in the event of a side impact to the vehicle, said apparatus comprising:

an inflatable occupant protection device having a deflated condition and being inflatable into a position between the side structure of the vehicle and the vehicle occupant for helping to protect the vehicle occupant;

an inflator which is actuatable to provide inflation fluid for inflating said inflatable device, said inflator having a longitudinal axis, a first end portion, a second end portion, and a central portion between said first and second end portions;

said central portion of said inflator including a cylindrical side wall of said inflator, said first end portion of said inflator including a first end surface extending transverse to said cylindrical side wall, said second end portion of said inflator including a second end surface extending transverse to said cylindrical side wall;

a diffuser receiving said inflator, said diffuser having a central wall portion and first and second opposite end portions;

means for connecting said diffuser and said inflator with the vehicle seat;

said central wall portion of said diffuser being spaced radially outward from said central portion of said inflator to define a diffuser chamber between said central wall portion of said diffuser and said central portion of said inflator;

said first end portion of said diffuser extending radially inward from said central wall portion of said diffuser and engaging said transversely extending first end surface of said inflator and blocking axial movement of said inflator in a first axial direction; and said second end portion of said diffuser having a curl portion extending radially inward from said central wall portion of said diffuser in a direction toward said longitudinal axis, said curl portion of said diffuser engaging said transversely extending second end surface of said inflator and blocking radial movement of said second end portion of said inflator and blocking axial movement of said inflator in a second axial direction opposite to said first axial direction.

4. An apparatus as set forth in claim 3 wherein said central wall portion of said diffuser comprises a cylindrical wall having a cylindrical inner surface;

said central portion of said inflator having a cylindrical outer surface which is spaced radially inward from said cylindrical inner surface of said diffuser and having at least one fluid outlet for directing inflation fluid from said inflator into said diffuser chamber;

said central wall portion of said diffuser having a plurality of openings for directing inflation fluid from said diffuser chamber into said inflatable device.

5. An apparatus as set forth in claim 3 wherein said inflator comprises a container having an inflation fluid chamber in which inflation fluid is stored under pressure, an ignitable material for, when ignited, heating said inflation fluid, and ignition means for igniting said ignitable material and for opening said container, said inflator including at least one fluid outlet for directing heated inflation fluid from said inflator into said diffuser chamber.

6. An apparatus as set forth in claim 3 wherein said second end portion of said inflator has a domed configuration including a convex outer surface which is presented toward said curl portion of said diffuser, said curl portion of said diffuser engaging said convex outer surface at a plurality of locations in a circular array extending around said longitudinal axis.

7. A vehicle safety apparatus for helping to protect an occupant of a vehicle seat in the event of a side impact to the vehicle, said apparatus comprising:

an inflatable occupant protection device having a deflated condition and being inflatable into a position between the side structure of the vehicle and the vehicle occupant for helping to protect the vehicle occupant;

an inflator which is actuatable to provide inflation fluid for inflating said inflatable device, said inflator having a longitudinal axis, a first end portion, a second end portion, and a central portion between said first and second end portions;

means for supporting said inflator on the vehicle seat, consisting of a diffuser receiving said inflator, said diffuser having a central wall portion and first and second opposite end portions;

said central wall portion of said diffuser being spaced radially outward from said central portion of said inflator to define a diffuser chamber between said central wall portion of said diffuser and said central portion of said inflator;

said first end portion of said diffuser extending radially inward from said central wall portion of said diffuser and blocking axial movement of said inflator in a first axial direction; and said second end portion of said diffuser extending radially inward from said central wall portion of said diffuser in a direction toward said longitudinal axis, said second end portion of said diffuser blocking axial movement of said inflator in a second axial direction opposite to said first axial direction;

said first and second end portions of said diffuser exerting an axial clamping force on said inflator in the range of from about 80 pounds to about 300 pounds to block axial movement of said inflator relative to the vehicle seat.

8. An apparatus as set forth in claim 7 wherein said second end portion of said diffuser comprises a wall portion of said diffuser which is curled radially inward and axially in a direction toward said first end portion of said diffuser.

9. An apparatus as set forth in claim 7 wherein said inflator comprises a container having an inflation fluid chamber in which inflation fluid is stored under pressure, an ignitable material for, when ignited, heating said inflation fluid, and ignition means for igniting said ignitable material and for opening said container, said inflator including at least one fluid outlet for directing heated inflation fluid from said inflator into said diffuser chamber.

10. A vehicle safety apparatus for helping to protect an occupant of a vehicle in the event of an impact to the vehicle, said apparatus comprising:

an inflatable occupant protection device having a deflated condition and being inflatable into a position adjacent to the vehicle occupant for helping to protect the vehicle occupant;

an inflator which is actuatable to provide inflation fluid for inflating said inflatable device, said inflator having a longitudinal axis, a first end portion, a second end portion, and a central portion between said first and second end portions;

a diffuser receiving said inflator, said diffuser having a central wall portion and first and second opposite end portions;

means for supporting said diffuser and said inflator on the vehicle;

said central wall portion of said diffuser being spaced radially outward from said central portion of said inflator to define a diffuser chamber between said central wall portion of said diffuser and said central portion of said inflator;

said first end portion of said diffuser extending radially inward from said central wall portion of said diffuser and blocking axial movement of said inflator in a first axial direction; and said second end portion of said diffuser having a curl portion extending radially inward from said central wall portion of said diffuser in a direction toward said longitudinal axis and toward said first end portion of said diffuser, said curl portion of said diffuser blocking radial movement of said second end portion of said inflator and blocking axial movement of said inflator in a second axial direction opposite to said first axial direction;

wherein said curl portion of said diffuser comprises a cylindrical wall portion of said diffuser which is curled radially inward and axially in a direction toward said first end portion of said diffuser about a circular bending axis which is centered on said longitudinal axis.

11. A vehicle safety apparatus for helping to protect an occupant of a vehicle in the event of an impact to the vehicle, said apparatus comprising:

an inflatable occupant protection device having a deflated condition and being inflatable into a position adjacent to the vehicle occupant for helping to protect the vehicle occupant;

an inflator which is actuatable to provide inflation fluid for inflating said inflatable device, said inflator having a longitudinal axis, a first end portion, a second end portion, and a central portion between said first and second end portions;

a diffuser receiving said inflator, said diffuser having a central wall portion and first and second opposite end portions;

means for supporting said diffuser and said inflator on the vehicle;

said central wall portion of said diffuser being spaced radially outward from said central portion of said inflator to define a diffuser chamber between said central wall portion of said diffuser and said central portion of said inflator;

said first end portion of said diffuser extending radially inward from said central wall portion of said diffuser and blocking axial movement of said inflator in a first axial direction; and said second end portion of said diffuser having a curl portion extending radially inward from said central wall portion of said diffuser in a direction toward said longitudinal axis and toward said first end portion of said diffuser, said curl portion of said diffuser blocking radial movement of said second end portion of said inflator and blocking axial movement of said inflator in a second axial direction opposite to said first axial direction;

wherein said curl portion of said diffuser has an inner side surface and an opposite outer side surface, said curl portion of said diffuser comprising a cylindrical wall portion which is deformed radially inwardly by more than 90° at a plurality of locations centered on said longitudinal axis so that said outer side surface of said curl portion is presented in a direction toward said longitudinal axis.

12. A vehicle safety apparatus for helping to protect an occupant of a vehicle in the event of an impact to the vehicle, said apparatus comprising:

an inflatable occupant protection device having a deflated condition and being inflatable into a position adjacent to the vehicle occupant for helping to protect the vehicle occupant;

an inflator which is actuatable to provide inflation fluid for inflating said inflatable device, said inflator having a longitudinal axis, a first end portion, a second end portion, and a central portion between said first and second end portions;

a diffuser receiving said inflator, said diffuser having a central wall portion and first and second opposite end portions;

means for supporting said diffuser and said inflator on the vehicle;

said central wall portion of said diffuser being spaced radially outward from said central portion of said inflator to define a diffuser chamber between said central wall portion of said diffuser and said central portion of said inflator;

said first end portion of said diffuser extending radially inward from said central wall portion of said diffuser and blocking axial movement of said inflator in a first axial direction; and said second end portion of said diffuser having a curl portion extending radially inward from said central wall portion of said diffuser in a direction toward said longitudinal axis and toward said first end portion of said diffuser, said curl portion of said diffuser blocking radial movement of said second end portion of said inflator and blocking axial movement of said inflator in a second axial direction opposite to said first axial direction;

wherein said curl portion of said diffuser is spaced apart from said second end portion of said inflator, said apparatus further comprising a cushion disposed intermediate said curl portion of said diffuser and said second end portion of said inflator, said curl portion of said diffuser clamping said cushion against said second end portion of said inflator to block radial and axial movement of said second end portion of said inflator.

13. A vehicle safety apparatus for helping to protect an occupant of a vehicle seat in the event of a side impact to the vehicle, said apparatus comprising:

an inflatable occupant protection device having a deflated condition and being inflatable into a position between the side structure of the vehicle and the vehicle occupant for helping to protect the vehicle occupant;

an inflator which is actuatable to provide inflation fluid for inflating said inflatable device, said inflator having a longitudinal axis, a first end portion, a second end portion, and a central portion between said first and second end portions;

a diffuser receiving said inflator, said diffuser having a central wall portion and first and second opposite end portions;

means for connecting said diffuser and said inflator with the vehicle seat;

said central wall portion of said diffuser being spaced radially outward from said central portion of said inflator to define a diffuser chamber between said central wall portion of said diffuser and said central portion of said inflator;

said first end portion of said diffuser extending radially inward from said central wall portion of said diffuser and blocking axial movement of said inflator in a first axial direction; and said second end portion of said diffuser having a curl portion extending radially inward from said central wall portion of said diffuser in a direction toward said longitudinal axis and toward said first end portion of said diffuser, said curl portion of said diffuser blocking radial movement of said second end portion of said inflator and blocking axial movement of said inflator in a second axial direction opposite to said first axial direction;

wherein said curl portion of said diffuser comprises a cylindrical wall portion of said diffuser which is curled radially inward and axially in a direction toward said first end portion of said diffuser about a circular bending axis which is centered on said longitudinal axis.

14. A vehicle safety apparatus for helping to protect an occupant of a vehicle seat in the event of a side impact to the vehicle, said apparatus comprising:

an inflatable occupant protection device having a deflated condition and being inflatable into a position between the side structure of the vehicle and the vehicle occupant for helping to protect the vehicle occupant;

an inflator which is actuatable to provide inflation fluid for inflating said inflatable device, said inflator having a longitudinal axis, a first end portion, a second end portion, and a central portion between said first and second end portions;

a diffuser receiving said inflator, said diffuser having a central wall portion and first and second opposite end portions;

means for connecting said diffuser and said inflator with the vehicle seat;

said central wall portion of said diffuser being spaced radially outward from said central portion of said inflator to define a diffuser chamber between said central wall portion of said diffuser and said central portion of said inflator;

said first end portion of said diffuser extending radially inward from said central wall portion of said diffuser and blocking axial movement of said inflator in a first axial direction; and said second end portion of said diffuser having a curl portion extending radially inward from said central wall portion of said diffuser in a direction toward said longitudinal axis and toward said first end portion of said diffuser, said curl portion of said diffuser blocking radial movement of said second end portion of said inflator and blocking axial movement of said inflator in a second axial direction opposite to said first axial direction;

wherein said curl portion of said diffuser has an inner side surface and an opposite outer side surface, said curl portion of said diffuser comprising a cylindrical wall portion which is deformed radially inwardly by more than 90° at a plurality of locations centered on said longitudinal axis so that said outer side surface of said curl portion is presented in a direction toward said longitudinal axis.

15. A vehicle safety apparatus for helping to protect an occupant of a vehicle seat in the event of a side impact to the vehicle, said apparatus comprising:

an inflatable occupant protection device having a deflated condition and being inflatable into a position between the side structure of the vehicle and the vehicle occupant for helping to protect the vehicle occupant;

an inflator which is actuatable to provide inflation fluid for inflating said inflatable device, said inflator having a longitudinal axis, a first end portion, a second end portion, and a central portion between said first and second end portions;

a diffuser receiving said inflator, said diffuser having a central wall portion and first and second opposite end portions;

means for connecting said diffuser and said inflator with the vehicle seat;

said central wall portion of said diffuser being spaced radially outward from said central portion of said inflator to define a diffuser chamber between said central wall portion of said diffuser and said central portion of said inflator;

said first end portion of said diffuser extending radially inward from said central wall portion of said diffuser and blocking axial movement of said inflator in a first axial direction; and said second end portion of said diffuser having a curl portion extending radially inward from said central wall portion of said diffuser in a direction toward said longitudinal axis and toward said first end portion of said diffuser, said curl portion of said diffuser blocking radial movement of said second end portion of said inflator and blocking axial movement of said inflator in a second axial direction opposite to said first axial direction;

wherein said curl portion of said diffuser is spaced apart from said second end portion of said inflator, said apparatus further comprising a cushion disposed intermediate said curl portion of said diffuser and said second end portion of said inflator, said curl portion of said diffuser clamping said cushion against said second end portion of said inflator to block radial and axial movement of said second end portion of said inflator.

* * * * *